United States Patent
Liu et al.

(10) Patent No.: US 10,002,402 B2
(45) Date of Patent: Jun. 19, 2018

(54) LEARNING CONVOLUTION NEURAL NETWORKS ON HETEROGENEOUS CPU-GPU PLATFORM

(71) Applicant: SONY CORPORATION, Tokyo (JP)

(72) Inventors: Ming-Chang Liu, San Jose, CA (US); Xun Xu, Cupertino, CA (US); Da Li, San Francisco, CA (US)

(73) Assignee: Sony Corporation, Tokyo (JP)

( * ) Notice: Subject to any disclaimer, the term of this patent is extended or adjusted under 35 U.S.C. 154(b) by 81 days.

(21) Appl. No.: 15/217,475

(22) Filed: Jul. 22, 2016

(65) Prior Publication Data

US 2017/0024849 A1 Jan. 26, 2017

Related U.S. Application Data

(60) Provisional application No. 62/195,890, filed on Jul. 23, 2015.

(51) Int. Cl.
| | |
|---|---|
| *G06F 15/16* | (2006.01) |
| *G06T 1/20* | (2006.01) |
| *G06N 3/08* | (2006.01) |
| *G06N 3/04* | (2006.01) |

(52) U.S. Cl.
CPC .............. *G06T 1/20* (2013.01); *G06N 3/04* (2013.01); *G06N 3/08* (2013.01)

(58) Field of Classification Search
CPC ........ G06N 3/08; G06N 3/084; G06N 99/005; G06T 1/20; G06T 2200/28; G06F 9/38
See application file for complete search history.

(56) References Cited

U.S. PATENT DOCUMENTS

| | | | |
|---|---|---|---|
| 8,442,927 B2 | 5/2013 | Chakradhar et al. | |
| 2007/0211064 A1* | 9/2007 | Buck | G06N 3/08 345/519 |
| 2014/0180989 A1 | 6/2014 | Krizhevsky et al. | |
| 2016/0321776 A1* | 11/2016 | Zou | G06T 1/20 |

FOREIGN PATENT DOCUMENTS

WO    2014040003 A1    3/2014

* cited by examiner

*Primary Examiner* — Hau H Nguyen
(74) *Attorney, Agent, or Firm* — Haverstock & Owens LLP

(57) ABSTRACT

Convolution neural networks are able to be trained using a GPU and a CPU. To efficiently utilize a device's resources, the HetNet and HybNet approaches have been developed. The HetNet approach separates batches into partitions such that the GPU and CPU process separate batches. The HybNet approach separates the layers of a convolution neural network for the GPU and CPU.

14 Claims, 3 Drawing Sheets

LEARNING CONVOLUTION NEURAL NETWORKS ON HETEROGENEOUS CPU-GPU PLATFORM

CROSS-REFERENCE TO RELATED APPLICATION(S)

This application claims the benefit of U.S. Provisional Patent Application Ser. No. 62/195,890, filed Jul. 23, 2015, and titled "LEARNING CONVOLUTION NEURAL NETWORKS ON HETEROGENEOUS CPU-GPU PLATFORM," which is hereby incorporated by reference in its entirety for all purposes.

FIELD OF THE INVENTION

The present invention relates to the field of neural networks. More specifically, the present invention relates to learning convolution neural networks.

BACKGROUND OF THE INVENTION

Deep learning is a branch of machine learning and recently has become a very hot topic in both academia and industry. Convolutional Neural Network (CNN) is probably the most successful model of deep learning and has made many breakthroughs in various fields like computer vision and speech recognition.

In the past few years, Convolutional Neural Networks (CNNs) have been succeeded in various machine-learning domains. The traditional method to train CNNs has merely relied on a Graphics Processing Unit (GPU). In this scenario, the Central Processing Unit (CPU) is responsible for reading data and sending to the data to the GPU, and the GPU will finish the training process. There are several disadvantages of this de factor approach: (1) CPU computation power is wasted (2) The model sizes of CNNs are restricted because GPU has a very limited global memory.

Conventional methods for training CNNs either use the CPU or GPU, not together. Because of the high throughput of the graphic processing unit (GPU), using GPUs in training CNNs has become a standard approach. There are a lot of frameworks or tools (e.g. cuda-convnet, Caffe, Torch7) which use a GPU as the computing backend to accelerate the training of CNN models.

SUMMARY OF THE INVENTION

Convolution neural networks are able to be trained using a GPU and a CPU. To efficiently utilize a device's resources, the HetNet and HybNet approaches have been developed. The HetNet approach separates batches into partitions such that the GPU and CPU process separate batches. The HybNet approach separates the layers of a convolution neural network for the GPU and CPU.

In one aspect, a method comprises implementing a first model on a central processing unit and implementing a second model on a graphics processing unit, wherein when data is retrieved, the data is partitioned into a first batch and a second batch, and the central processing unit is trained using the first model and the first batch, and the graphics processing unit is trained using the second model and the second batch, wherein the training occurs in parallel. The training includes a forward and a backward propagation phase, and after the forward and backward propagation phase is complete, the first model on the central processing unit generates a first gradient, and the second model on the graphics processing unit generates a second gradient. The method further comprises merging the first gradient and the second gradient, and updating parameters of the first model and the second model. Partitioning the data is static based on profiling results, wherein profiling is performed before training and a partition ratio is set manually. Partitioning the data is dynamic by measuring processing time of the first model and the second model and performing automatic tuning to ensure processing by the central processing unit and the graphics processing unit finish at approximately the same time. The first gradient and the second gradient are merged using a weighted sum.

In another aspect, an apparatus comprises a central processing unit configured for implementing a first model, a graphics processing unit configured for implementing a second model, wherein when data is retrieved, the data is partitioned into a first batch and a second batch, and the central processing unit is trained using the first model and the first batch, and the graphics processing unit is trained using the second model and the second batch, wherein the training occurs in parallel. The training includes a forward and a backward propagation phase, and after the forward and backward propagation phase is complete, the first model on the central processing unit generates a first gradient, and the second model on the graphics processing unit generates a second gradient. The apparatus further comprising merging the first gradient and the second gradient, and updating parameters of the first model and the second model. Partitioning the data is static based on profiling results, wherein profiling is performed before training and a partition ratio is set manually. Partitioning the data is dynamic by measuring processing time of the first model and the second model and performing automatic tuning to ensure processing by the central processing unit and the graphics processing unit finish at approximately the same time. The first gradient and the second gradient are merged using a weighted sum.

In another aspect, a method comprises processing data, with a central processing unit, using fully connected layers of a neural network and processing the data, with a graphics processing unit, using convolutional and pooling layers of the neural network. In forward propagation, the data goes through convolutional layers and pooling layers on the graphics processing unit first, and then the output of last pooling layer is copied to the central processing unit, and then, the fully connected layers perform the remaining forward path. In backward propagation, the data is processed through the fully connected layers on the central processing unit, and after being processed by the last fully connected layer, the propagated gradients are copied from the central processing unit to the graphics processing unit, and then, the graphics processing unit performs the remaining backward propagation to determine gradients. The graphics processing unit is partitioned into a plurality of partitions so that when the graphics processing unit is transferring a piece of data, the graphics processing unit is able to process another piece of data.

In yet another aspect, an apparatus comprises a central processing unit configured for processing data using fully connected layers of a neural network and a graphics processing unit configured for processing the data using convolutional and pooling layers of the neural network. In forward propagation, the data goes through convolutional layers and pooling layers on the graphics processing unit first, and then the output of last pooling layer is copied to the central processing unit, and then, the fully connected layers perform the remaining forward path. In backward propagation, the data is processed through the fully connected layers on the central processing unit, and after being processed by the last fully connected layer, the propagated gradients are copied from the central processing unit to the graphics processing unit, and then, the graphics processing unit performs the remaining backward propagation to determine gradients. The graphics processing unit is partitioned into a plurality of partitions so that when the graphics processing unit is transferring a piece of data, the graphics processing unit is able to process another piece of data.

DETAILED DESCRIPTION OF THE PREFERRED EMBODIMENT

Although serial CPU performance is worse than the GPU, highly optimized parallel CPU codes are able to reduce the performance gap dramatically. Therefore, most of the CPU computation power in the system is largely wasted. While the main focus of the research community is on accelerating CNN training on the GPU, the CPU is also able to be utilized, so as to maximize the hardware utilization on a heterogeneous high-performance computing system. Novel training methods/architectures (HetNet and HybNet) address these problems. Both of these methods utilize the computation power of the CPU in the system to either speedup the training process or make training very large CNN models feasible on a GPU with limited global memory.

Described herein are two different CNN training methods on heterogeneous CPU-GPU platforms: HetNet (aka "mini batch partition") and HybNet (aka "layer partition").

Figure 1:
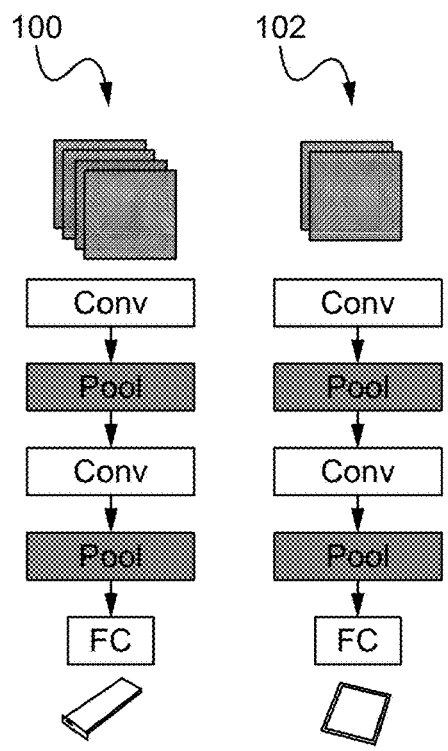
FIG. 1 shows how CNN models are trained with the HetNet approach according to some embodiments.

FIG. 1 shows how CNN models are trained with the HetNet approach according to some embodiments. In this approach, two models are used: one model on the CPU (CPUNet) and one model on the GPU (GPUNet). When the input data is fetched from the hard drive as a mini batch, the whole mini batch is split into two: one for the CPU (CPU batch) and the other for the GPU (GPU batch). After the partition, CPUNet and GPUNet are each trained in parallel with their own mini batch. After a full forward and backward propagation phase, the CPUNet and GPUNet get their own gradients. The gradients are then merged, and parameters of CPUNet and GPUNet are updated.

Figure 2:
FIG. 2 shows the training timeline of a GPU only approach 200 with three different cases of the HetNet solution.
Figure 2:
Figure 2:
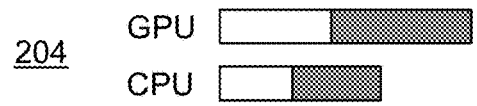
Figure 2:
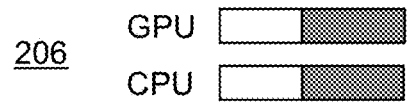

One problem to be addressed is how to partition the mini batch to avoid unbalanced workloads. CPU batch and GPU batch are used to refer to the data used to train CPUNet and GPUNet. FIG. 2 shows the training timeline of a GPU only approach 200 with three different cases of the HetNet solution. The approach 202 is that the CPUNet is overloaded, which is even slower than GPU only approach 200. The approach 204 shows the partition is not efficient because GPU batch is much larger than CPU batch so that CPUNet finishes training in a much shorter amount of time. Although in the approach 204, the training time is able to be reduced, but it is less efficient compared to the optimal partition. The approach 206 shows the best partition such that CPUNet and GPUNet finish training at the same time.

$R_{CPU}$ and $R_{GPU}$ are able to be used to denote the ratio of CPU and GPU batch size to the total mini batch size, respectively. Then, it is known that:

$$R_{CPU} + R_{GPU} = 1$$

$$R_{CPU} > 0 \text{ and } R_{GPU} > 0$$

So the problem is how to decide $R_{CPU}$ and $R_{GPU}$ so that execution time on CPUNet and GPUNet is balanced. The perfect partition should be able to let both CPUNet and GPUNet finish training of their own batch at the same time. There are two approaches: static partition and dynamic partition. The static partition is based on profiling results. Profiling is performed before the training, and the partition ratio is set manually. On the contrary, the dynamic partition measures the processing time of both CPUNet and GPUNet at runtime and performs automatic tuning. For instance, if in the current mini batch, CPUNet takes more time than GPUNet, the dynamic partition will reduce the workload on the CPU by assigning a smaller size of the CPU batch and a larger size of the GPU batch in next iteration, so that the processing of the CPU and the processing of the GPU finish at approximately the same time (e.g., within 1 nanosecond, 1 microsecond, 1 millisecond, 1 second or another set time).

The second problem addressed is how to update the parameters of the training neural network. Training CNNs includes updating parameters of CNNs using gradients from back propagation. However, in HetNet, two different copies of gradients exist. One is from the CPUNet, and the other is from GPUNet. A straightforward but reasonable approach is that merge the two copies of gradients using weight sum. The equation is:

$$\vec{G} = R_{CPU} \vec{G}_{CPU} + R_{GPU} \vec{G}_{GPU}$$

where $\vec{G}$ is a merged gradient vector, $\vec{G}_{CPU}$ is a gradient vector of CPUNet and $\vec{G}_{GPU}$ is a gradient vector of GPUNet.

HetNet is able to utilize both CPUs and GPUs in the system thus increase the total hardware utilization. The only overhead is merging two copies of gradients. However, this operation is able to be easily vectorized and calculated efficiently. The training time is able to be reduced. From an energy efficiency perspective, due to the development of fabrication technology, more transistors are able to be built into the same die area, but the static power consumption is considerable. So even when the CPU is idle, it contributes a significant amount to the total power consumption. HetNet also improves the energy efficiency by including CPUs for computation tasks.

Figure 3:
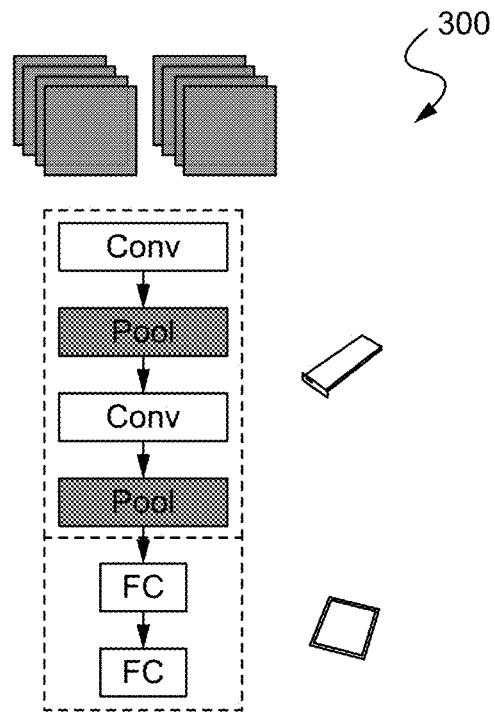
FIG. 3 shows how a CNN model is trained with the HybNet approach according to some embodiments.

FIG. 3 shows how a CNN model is trained with the HybNet approach according to some embodiments. In the Hybnet approach 300, all of the fully connected layers are placed on the CPU, while all convolutional and pooling layers are placed on the GPU. In forward propagation, the data goes through convolutional layers and pooling layers on the GPU first, and then the output of last pooling layer is copied to the CPU. Then, the fully connected layers perform the remaining forward path. For the backward path, the data is processed through the fully connected layers on the CPU, and after being processed by the last fully connected layer, the propagated gradients are copied from CPU to GPU. Then, GPU does the remaining backward propagation to determine the gradients.

The HybNet approach partitions the network into a GPU part (beginning convolutional and pooling layers) and a CPU part (ending fully connected layers). The HybNet moves parts of the neural network to the CPU so that the limited GPU global memory is able to hold a larger model (e.g., the model occupies at least 80%, 90%, 95%, or 99% of the GPU global memory). But this will incur data transfer between CPU and GPU for every mini batch. Also, even fully connected layers perform vector-vector multiplications, which are able to be efficiently implemented on a CPU (e.g. Open BLAS, MLK); the performance gap between CPU and GPU cannot be ignored. But, the benefit is that the GPU with limited global memory is able to fit a larger model, which is able to lead to higher accuracy in machine learning tasks.

One method to optimize HybNet approach is referred to as "double buffering." In this method, GPU memory is partitioned into two chunks so that when the GPU is transferring one piece of data, it is able to process the other piece. By doing this, the GPU is able to potentially overlap data transfer with computation. A similar approach is able to be applied to HybNet. Since fully connected layers carry a large amount of parameters, and intermediate steps and are moved to the CPU, it is possible to utilize this optimization.

Figure 4:
FIG. 4 shows the execution timeline of three cases: GPU only, HybNet without double buffering and HybNet with double buffering.
Figure 4:
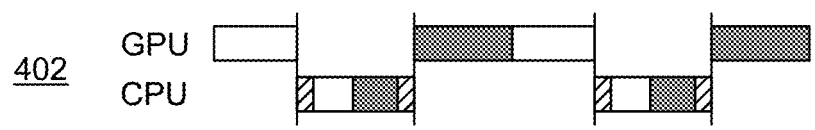
Figure 4:
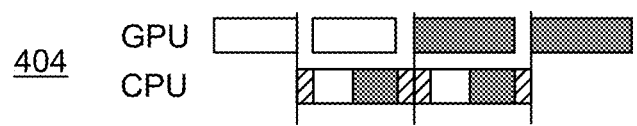

FIG. 4 shows the execution timeline of three cases: GPU only, HybNet without double buffering and HybNet with double buffering. Two mini batches are processed in FIG. 4 for illustration purposes. FIG. 4, shows how the GPU only approach 400 processes two mini batches, which is the baseline. FIG. 4 shows the HybNet method 402 without using double buffering. In this case, when the GPU is performing forward and backward propagation of convolutional layer and pooling layer, the CPU is idle. The same thing happens to GPU when CPU is performing forward and backward propagation of a fully connected layer. So even when both the CPU and GPU are utilized, there is no overlap of computation time. FIG. 4 shows HybNet with double buffering 404. In this case, when the CPU is processing one mini batch, the GPU is able to start to process another mini batch without waiting for the results. This may lead to potential overlap of CPU computation with GPU computation so that system throughput is able to be increased. From FIG. 4, it is able to be seen that compared to the baseline in approach 400, HybNet without double buffering 402 sacrifices the performance to fit larger model exceeding the limited GPU global memory, and with double buffering, HybNet is able to speed up training.

Figure 5:
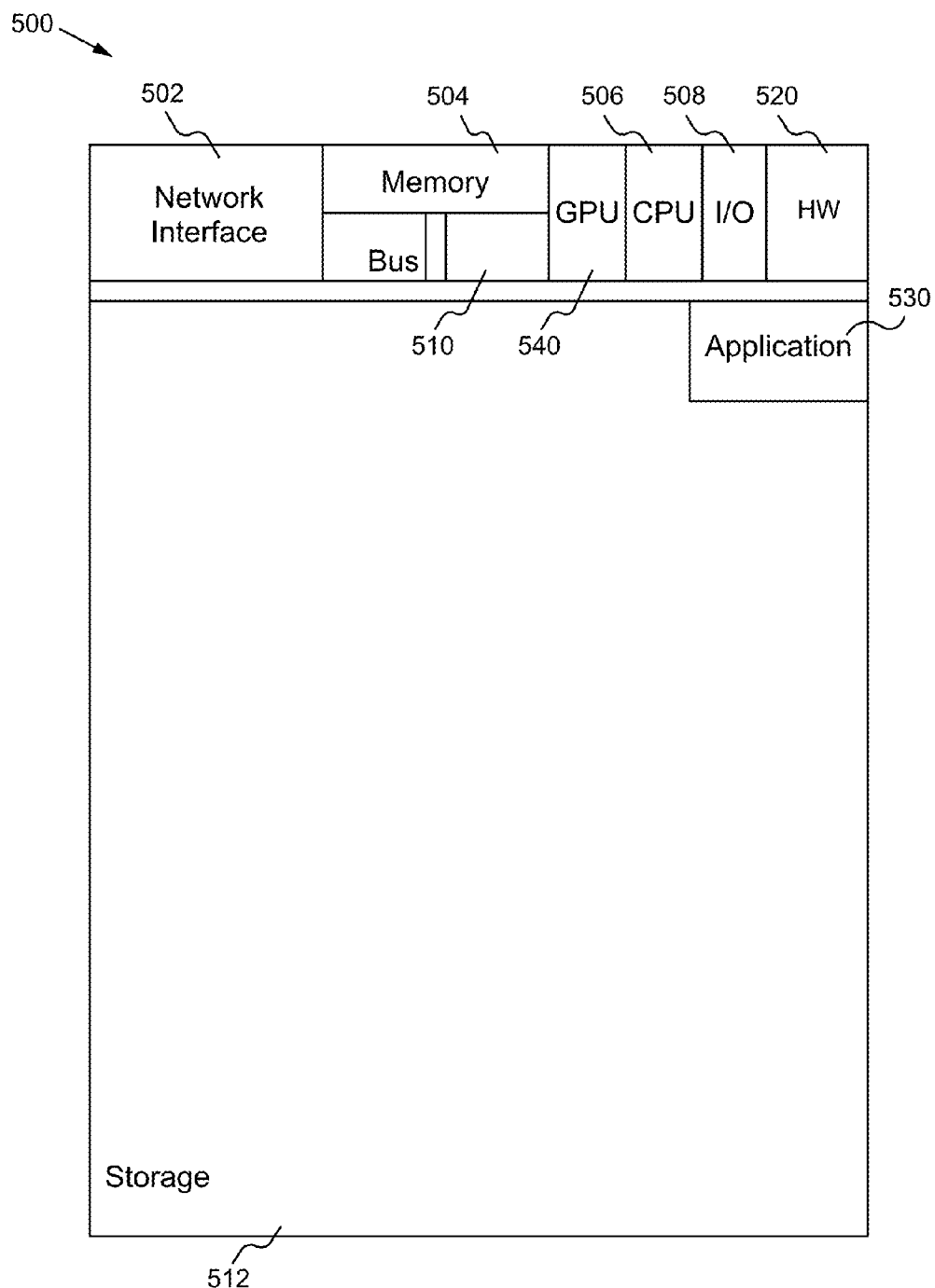
FIG. 5 illustrates a block diagram of an exemplary computing device configured to implement the CNN learning method according to some embodiments.

FIG. 5 illustrates a block diagram of an exemplary computing device configured to implement the CNN learning method according to some embodiments. The computing device 500 is able to be used to acquire, store, compute, process, communicate and/or display information such as images and videos. In general, a hardware structure suitable for implementing the computing device 500 includes a network interface 502, a memory 504, a CPU 506, a GPU 540, I/O device(s) 508, a bus 510 and a storage device 512. The choice of CPU 506 and/or GPU 540 is not critical as long as a suitable CPUs/GPUs with sufficient speed are chosen. The CPU and/or GPU are each able to be single processors and/or multiple processors. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. CNN learning application(s) 530 used to perform the CNN learning method are likely to be stored in the storage device 512 and memory 504 and processed as applications are typically processed. More or fewer components shown in FIG. 5 are able to be included in the computing device 500. In some embodiments, CNN learning hardware 520 is included. Although the computing device 500 in FIG. 5 includes applications 530 and hardware 520 for the CNN learning method, the CNN learning method is able to be implemented on a computing device in hardware, firmware, software or any combination thereof. For example, in some embodiments, the CNN learning applications 530 are programmed in a memory and executed using a processor. In another example, in some embodiments, the CNN learning hardware 520 is programmed hardware logic including gates specifically designed to implement the CNN learning method.

In some embodiments, the CNN learning application(s) 530 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, an augmented reality device, a virtual reality device, a home entertainment system, smart jewelry (e.g., smart watch) or any other suitable computing device.

To utilize the CNN learning method, a computing device with a CPU and a GPU trains using CNN learning. The device acquires/receives a data set, and partitions the processing of the data set between the CPU and the GPU. The device learns more efficiently and/or better by implementing either a HetNet approach or a HybNet approach which partition the learning process between the CPU and the GPU.

In operation, the CNN learning method expedites CNN learning by optimizing training using the CPU and GPU efficiently.

Although the learning described herein is related to CNN learning, any type of learning/training is able to be implemented using the methods/systems described herein.

Some Embodiments of Learning Convolution Neural Networks on Heterogenous CPU-GPU Platform 1. A method comprising:
   a. implementing a first model on a central processing unit; and
   b. implementing a second model on a graphics processing unit, wherein when data is retrieved, the data is partitioned into a first batch and a second batch, and the central processing unit is trained using the first model and the first batch, and the graphics processing unit is trained using the second model and the second batch, wherein the training occurs in parallel.
2. The method of clause 1 wherein the training includes a forward and a backward propagation phase, and after the forward and backward propagation phase is complete, the first model on the central processing unit generates a first gradient, and the second model on the graphics processing unit generates a second gradient.
3. The method of clause 2 further comprising merging the first gradient and the second gradient, and updating parameters of the first model and the second model.
4. The method of clause 1 wherein partitioning the data is static based on profiling results, wherein profiling is performed before training and a partition ratio is set manually.
5. The method of clause 1 wherein partitioning the data is dynamic by measuring processing time of the first model and the second model and performing automatic tuning to ensure processing by the central processing unit and the graphics processing unit finish at approximately the same time.
6. The method of clause 2 wherein the first gradient and the second gradient are merged using a weighted sum.
7. An apparatus comprising:
   a. a central processing unit configured for implementing a first model;
   b. a graphics processing unit configured for implementing a second model, wherein when data is retrieved, the data is partitioned into a first batch and a second batch, and the central processing unit is trained using the first model and the first batch, and the graphics processing unit is trained using the second model and the second batch, wherein the training occurs in parallel.
8. The apparatus of clause 7 wherein the training includes a forward and a backward propagation phase, and after the forward and backward propagation phase is complete, the first model on the central processing unit generates a first gradient, and the second model on the graphics processing unit generates a second gradient.
9. The apparatus of clause 8 further comprising merging the first gradient and the second gradient, and updating parameters of the first model and the second model.
10. The apparatus of clause 7 wherein partitioning the data is static based on profiling results, wherein profiling is performed before training and a partition ratio is set manually.
11. The apparatus of clause 7 wherein partitioning the data is dynamic by measuring processing time of the first model and the second model and performing automatic tuning to ensure processing by the central processing unit and the graphics processing unit finish at approximately the same time.
12. The apparatus of clause 8 wherein the first gradient and the second gradient are merged using a weighted sum.
13. A method comprising:
   a. processing data, with a central processing unit, using fully connected layers of a neural network; and
   b. processing the data, with a graphics processing unit, using convolutional and pooling layers of the neural network.
14. The method of clause 13 wherein in forward propagation, the data goes through convolutional layers and pooling layers on the graphics processing unit first, and then the output of last pooling layer is copied to the central processing unit, and then, the fully connected layers perform the remaining forward path.
15. The method of clause 13 wherein in backward propagation, the data is processed through the fully connected layers on the central processing unit, and after being processed by the last fully connected layer, the propagated gradients are copied from the central processing unit to the graphics processing unit, and then, the graphics processing unit performs the remaining backward propagation to determine gradients.
16. The method of clause 13 wherein the graphics processing unit is partitioned into a plurality of partitions so that when the graphics processing unit is transferring a piece of data, the graphics processing unit is able to process another piece of data.
17. An apparatus comprising:
   a. a central processing unit configured for processing data using fully connected layers of a neural network; and
   b. a graphics processing unit configured for processing the data using convolutional and pooling layers of the neural network.
18. The apparatus of clause 17 wherein in forward propagation, the data goes through convolutional layers and pooling layers on the graphics processing unit first, and then the output of last pooling layer is copied to the central processing unit, and then, the fully connected layers perform the remaining forward path.
19. The apparatus of clause 17 wherein in backward propagation, the data is processed through the fully connected layers on the central processing unit, and after being processed by the last fully connected layer, the propagated gradients are copied from the central processing unit to the graphics processing unit, and then, the graphics processing unit performs the remaining backward propagation to determine gradients.
20. The apparatus of clause 17 wherein the graphics processing unit is partitioned into a plurality of partitions so that when the graphics processing unit is transferring a piece of data, the graphics processing unit is able to process another piece of data.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
   a. implementing a first model on a central processing unit; and
   b. implementing a second model on a graphics processing unit, wherein when data is retrieved, the data is partitioned into a first batch and a second batch, and the central processing unit is trained using the first model and the first batch, and the graphics processing unit is trained using the second model and the second batch, wherein the training occurs in parallel, wherein partitioning the data is dynamic by measuring processing time of the first model and the second model and performing automatic tuning to ensure processing by the central processing unit and the graphics processing unit finish at approximately the same time.
2. The method of claim 1 wherein the training includes a forward and a backward propagation phase, and after the forward and backward propagation phase is complete, the first model on the central processing unit generates a first gradient, and the second model on the graphics processing unit generates a second gradient.

3. The method of claim 2 further comprising merging the first gradient and the second gradient, and updating parameters of the first model and the second model.

4. The method of claim 2 wherein the first gradient and the second gradient are merged using a weighted sum.

5. An apparatus comprising:
   a. a central processing unit configured for implementing a first model;
   b. a graphics processing unit configured for implementing a second model, wherein when data is retrieved, the data is partitioned into a first batch and a second batch, and the central processing unit is trained using the first model and the first batch, and the graphics processing unit is trained using the second model and the second batch, wherein the training occurs in parallel, wherein partitioning the data is dynamic by measuring processing time of the first model and the second model and performing automatic tuning to ensure processing by the central processing unit and the graphics processing unit finish at approximately the same time.

6. The apparatus of claim 5 wherein the training includes a forward and a backward propagation phase, and after the forward and backward propagation phase is complete, the first model on the central processing unit generates a first gradient, and the second model on the graphics processing unit generates a second gradient.

7. The apparatus of claim 6 further comprising merging the first gradient and the second gradient, and updating parameters of the first model and the second model.

8. The apparatus of claim 6 wherein the first gradient and the second gradient are merged using a weighted sum.

9. A method comprising:
   a. processing data, with a central processing unit, using fully connected layers of a neural network; and
   b. processing the data, with a graphics processing unit, using convolutional and pooling layers of the neural network, wherein in backward propagation, the data is processed through the fully connected layers on the central processing unit, and after being processed by the last fully connected layer, the propagated gradients are copied from the central processing unit to the graphics processing unit, and then, the graphics processing unit performs the remaining backward propagation to determine gradients.

10. The method of claim 9 wherein in forward propagation, the data goes through convolutional layers and pooling layers on the graphics processing unit first, and then the output of last pooling layer is copied to the central processing unit, and then, the fully connected layers perform the remaining forward path.

11. The method of claim 9 wherein the graphics processing unit is partitioned into a plurality of partitions so that when the graphics processing unit is transferring a piece of data, the graphics processing unit is able to process another piece of data.

12. An apparatus comprising:
   a. a central processing unit configured for processing data using fully connected layers of a neural network; and
   b. a graphics processing unit configured for processing the data using convolutional and pooling layers of the neural network, wherein in backward propagation, the data is processed through the fully connected layers on the central processing unit, and after being processed by the last fully connected layer, the propagated gradients are copied from the central processing unit to the graphics processing unit, and then, the graphics processing unit performs the remaining backward propagation to determine gradients.

13. The apparatus of claim 12 wherein in forward propagation, the data goes through convolutional layers and pooling layers on the graphics processing unit first, and then the output of last pooling layer is copied to the central processing unit, and then, the fully connected layers perform the remaining forward path.

14. The apparatus of claim 12 wherein the graphics processing unit is partitioned into a plurality of partitions so that when the graphics processing unit is transferring a piece of data, the graphics processing unit is able to process another piece of data.

* * * * *